Sept. 11, 1934. J. MICHAL 1,973,352
ADJUSTABLE WHEEL AND BRAKE MECHANISM FOR BABY CARRIAGES
Original Filed July 14, 1932  2 Sheets-Sheet 1
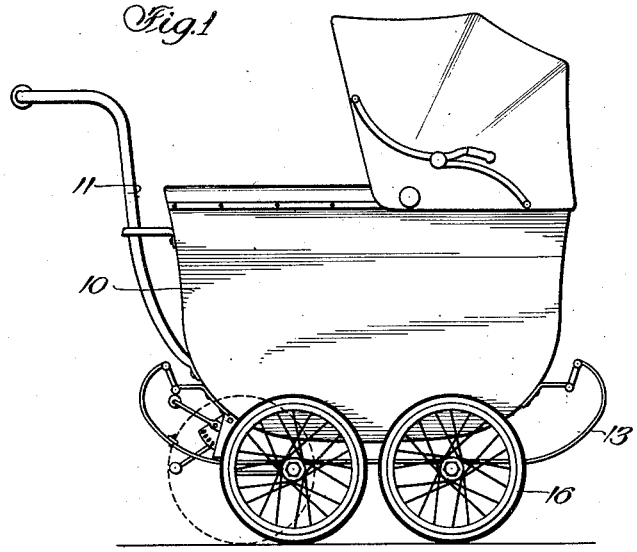
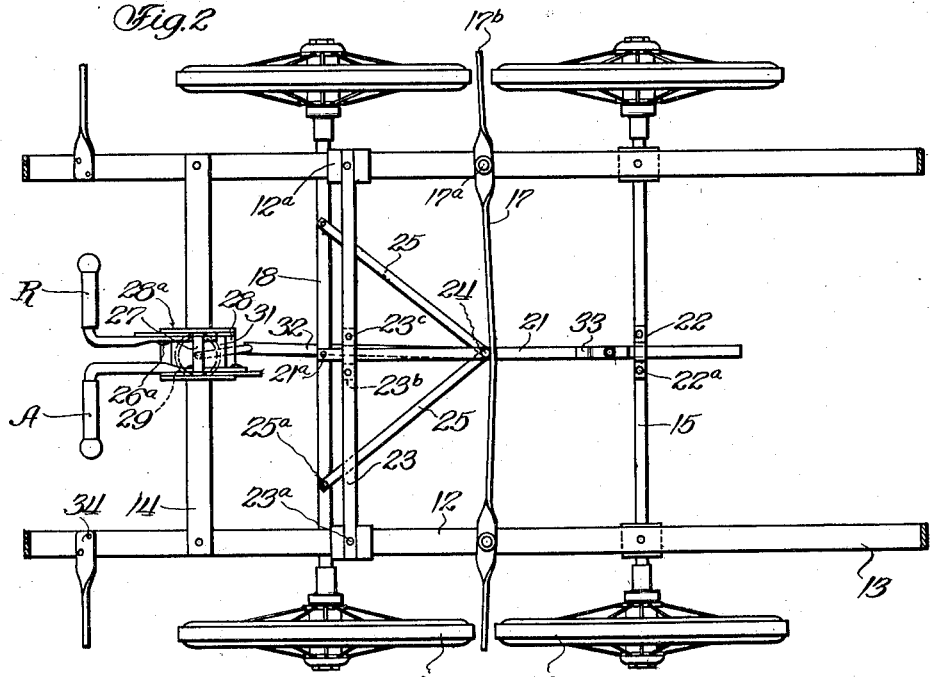
INVENTOR:-
James Michal
BY
ATTORNEYS.

Sept. 11, 1934. J. MICHAL 1,973,352
ADJUSTABLE WHEEL AND BRAKE MECHANISM FOR BABY CARRIAGES
Original Filed July 14, 1932 2 Sheets-Sheet 2
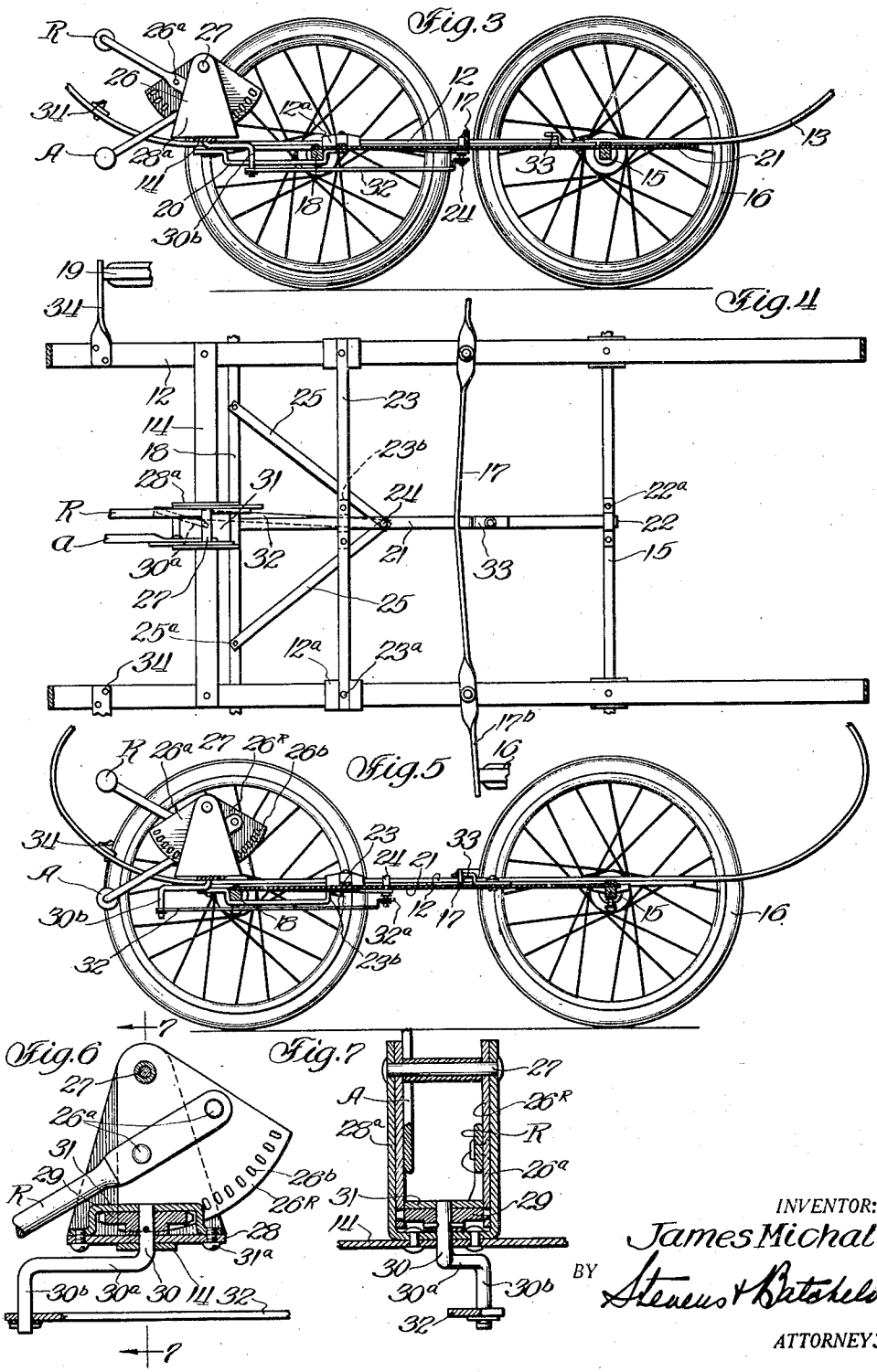
INVENTOR:-
James Michal
BY Stevens + Batchelor
ATTORNEYS.

Patented Sept. 11, 1934

1,973,352

UNITED STATES PATENT OFFICE 1,973,352

ADJUSTABLE WHEEL AND BRAKE MECHANISM FOR BABY CARRIAGES

James Michal, Chicago, Ill., assignor to Storkline Furniture Corporation, Chicago, Ill.

Application July 14, 1932, Serial No. 622,493
Renewed October 25, 1933

10 Claims. (Cl. 280—47)

My invention relates to baby carriages, and more particularly to means for stabilizing the same, and my main object is to provide a novel mechanism for lengthening the wheel-base of the carriage in order to safeguard it from being tipped over by the occupant or any other cause.

A further object of the invention is to incorporate in the novel mechanism means for applying the brake to the carriage wheels when the change in the wheel-base has been effected.

A still further object of the invention is to provide a control therefor which is operated by the foot and entirely free of the carriage body.

Another object of the invention is to provide means for locking the movable wheel unit in the advanced and retracted positions.

An additional object of the invention is to construct the mechanism with means for maintaining its alinement at all times.

An important object of the invention is to design the same along lines of simplicity in construction and ease of operation.

With the above objects in view and any others that may suggest themselves from the specification and claims to follow, a better understanding of the invention may be had by reference to the accompanying drawings, in which—

Fig. 1 is an elevation of the improved baby carriage;

Fig. 2 is a top plan view on an enlarged scale of the carriage chassis with its parts in normal condition;

Fig. 3 is a vertical section taken longitudinally through the middle of Fig. 2;

Fig. 4 is a view similar to Fig. 2, showing the stabilizing and braking mechanism in the retracted or changed position;

Fig. 5 is a view similar to Fig. 3, but corresponding to Fig. 4;

Fig. 6 is an enlarged detail view of a mechanism illustrated in the lower left-hand portions of Fig. 5; and Fig. 7 is a section on the line 7—7 of Fig. 6.

Referring specifically to the drawings, 10 denotes a coach type of baby carriage, although my improvements are applicable to other types of baby carriages. 11 denotes the handle of the carriage, 12 the frame of its chassis, and 13 the springs which rise from the frame to support the carriage body.

The frame generally comprises the side bars 12, a transverse connecting strap 14 at the rear and an axle 15 at the front, this axle carrying the front wheels 16. To the rear of the front axle, the frame receives by means of loose rivets 17a a transverse brake beam 17, the outer portions 17b thereof having a position immediately behind the front wheels 16 to serve as brake shoes for the same. By flexing the brake beam 17 in a rearward direction, the terminal shoes 17b are swung forward into frictional contact with the wheels, this type of brake being common in the baby carriage art.

The rear axle 18 of the carriage is not made fast to the frame 12, but lies immediately under the same and is intended to be given a forward and rearward movement to change the positions of the wheels 19 carried by this axle from forward—as indicated in Figs. 2 and 3—to a suitable distance rearward, as shown in Figs. 4 and 5. Thus, with the wheels of the carriage close, as in the first position, the carriage is suitable for service and a considerable portion of its weight may extend behind the rear wheels, so as to make it easy to push down on the handle 11 when the carriage is to be tilted, such as to climb over an obstacle or curb. On the other hand, when the unit of the rear wheels is retracted to the second mentioned position, also indicated by dotted lines in Fig. 1, the body is supported almost entirely forward of the rear wheels, and any attempt by the occupant to over-balance or tip it over will fail.

In carrying out the mechanism and method for moving the unit of the rear wheels, the frame bars 12 are supplemented on the under side by arch straps 20 serving as slide retainers for the axle 18. For purposes of alinement, the axle receives by means of a rivet 21a the rear end of a longitudinal bar 21, which extends forward, passing under the brake beam 17, over the front axle 15 and beyond the same to some extent. A strap 22, passing loosely over the bar 21 and retained by rivets 22a to the front axle 15 gives the bar a slide bearing relative to the latter; and a strip 23 is secured endwise by rivets 23a to a reinforcement 12a of the frame bars 12, this strip passing freely over the bar 21 and receiving from the under side a retainer strap 23b therefor, secured by rivets 23c and similar to the strap 22. The front axle 15 and the cross strip 23 thus form supports and bearings for the longitudinal movement of the bar 21; and the latter is perforated to receive a vertical pin 24 which also passes through the front ends of two braces 25 which diverge rearwardly to make a connection 25a with the rear axle 18. The bar 21 is therefore connected to the rear axle and guided to retain its longitudinal course; and the rear axle is braced to the bar in a manner to maintain its correct transverse position at all times.

In order that the unit of the rear wheels may be retracted and advanced as desired, a set of foot pedals for these operations is provided, at the rear of the carriage frame, the pedal to retract being indicated at R and the one to advance by A. The pedals are so disposed that one is in poised position when the other is in depressed position, and vice versa. Thus, when the pedal R is depressed with the foot to retract the rear wheel unit, the pedal A rises automatically to the poised position, so as to be in readiness for the foot when the unit is again to be advanced.

The foot pedals R and A are secured by rivets 26a inside a set of laterally spaced sector plates 26R and 26A corresponding to the respective pedals. The sector plates are journaled on a shaft 27 which is fast in the upstanding sides 28a of a base plate 28 riveted or otherwise fixedly secured on the rear cross strap 14 of the carriage frame. The sector plates are formed with an arcuate series of perforations 26b near their peripheries and meshing with a horizontal gear 29 mounted on the base plate 28 and centered on a vertical shaft 30. The shaft receives a retainer strap 31 at its upper end, the strap straddling the gear and being secured at its ends to the plate by screws 31a. The sectors are so positioned along the line of their travel as to become interconnected by means of the gear to secure the opposite operation of the foot pedals R and A as previously described. The shaft 30 passes through the base plate 28 and cross strap 14 to take a horizontal bend 30a and further a downward bend 30b which functions as a crank. Upon the latter is pivotally secured the rear end of a connecting bar 32 which extends forward to receive an upward offset 32a which is freely mounted upon the lower portion of the pin 24. Thus, when the pedal R is depressed its sector plate 26R rotates the gear 29 with the effect of swinging the crank 30b from the frontal position shown in Figs. 2 and 3 around to the rearward position indicated in Figs. 4 to 7; and when the pedal A is next depressed, the action is reversed.

It will be noted that the gearing is so calculated as to swing the crank 30b around somewhat further than a half-turn, so that it is on the remote side of the center line represented by the bar 21 when the back stroke of the wheel unit is finished. In passing the center point, the crank suffers the resistance offered by the brake beam 17 to a lug 33 carried by the bar 21. The brake beam is flexed during the time that the crank passes center so that when it is beyond center it is locked from returning by the tension of the brake beam. Incidentally, the flexing of the brake beam has applied the brake shoes 17b to the front wheels; and the rear wheels have attained frictional engagement on the back stroke with a pair of independent brake shoes 34 carried by the frame bars 12, so that all four wheels are locked against rotation. Conversely, when the rear wheel unit takes a forward stroke, the pin 24 flexes the brake beam 17 in the forward direction, as clearly shown in Fig. 2 with the effect of locking the crank 30b beyond the center in its forward position. Incidentally, this action of the brake beam releases its shoes 17b from the wheels 16, the shoes 34 also being released by the forward travel of the wheels 19. Thus, the shifting mechanism becomes automatically locked at the ends of its stroke, precluding any chance of its being accidentally moved from its terminal positions.

It will be seen that I have provided a mechanism which changes the wheel-base of the vehicle and controls the brakes at the same time. Yet, this mechanism is all embodied in the chassis or frame work of the carriage, and no part rises into the zone of the body or is required to be carried by the latter. Further, no hand-operated control is required, and the body carries nothing to detract from its ornamental appearance. Finally, the mechanism is easily actuated by either foot control and is of a simple and sturdy character.

I claim:

1. A carriage having an axle shiftable longitudinally of the carriage, a longitudinal bar carried by the axle, a foot-controlled crank movable forwardly and rearwardly beyond dead center, a connecting bar between the element and said longitudinal bar, spaced stops carried by the latter, and a spring bar between the stops and tensioned by the same as the crank moves over dead center at the end of each stroke, whereby to lock the crank from a return movement.

2. The structure of claim 1, pivots between the spring bar and the carriage frame, and extensions of the spring bar beyond the pivots movable toward and from positions occupied by the carriage wheels as a result of the free and tensioned positions of the spring bar, whereby such extensions serve as brake shoes for the carriage wheels.

3. The structure of claim 1, pivots between the spring bar and the carriage frame, and extensions of the spring bar beyond the pivots movable toward and from positions occupied by the carriage wheels as a result of the free and tensioned positions of the spring bar, whereby such extensions serve as brake shoes for the carriage wheels, said brake shoes applying to the front wheels, back wheels carried by said axle, and stationary brake shoes on the carriage frame and frictionally receiving the back wheels when the first-mentioned brake shoes engage the front wheels.

4. A carriage having an axle shiftable longitudinally of the carriage, a crank movable between forward and rearward positions, a connection between the crank and the axle to shift the latter in directions corresponding to said positions, dual pedals forming a foot control for the crank, and a gearing between the pedals to swing the crank forward when one pedal is operated and rearward when the other pedal is operated.

5. A carriage having an axle shiftable longitudinally of the carriage, a crank movable between forward and rearward positions, a connection between the crank and the axle to shift the latter in directions corresponding to said positions, companion pedals forming a foot control for the crank and individually depressible, and a gearing between the pedals to swing the crank forward when one pedal is depressed and rearward when the other pedal is depressed.

6. The structure of claim 5, and means in said gearing to procure the raising of one pedal when the other is depressed and vice versa.

7. The structure of claim 5, said gearing comprising a gear centered on the crank axis and meshed with the respective pedals on opposite sides of its periphery.

8. The structure of claim 5, said gearing comprising pivotally disposed shanks for the pedals and formed with arcuate racks, and a gear centered on the crank axis and meshing on opposite sides of its periphery with said racks.

9. The structure of claim 4, and means to swing the crank in either direction beyond dead center.

10. The structure of claim 4, means to swing the crank in either direction beyond dead center, and means tensioned as the crank moves over dead center and effective to lock the crank from a return movement.

JAMES MICHAL.